US009515980B2

(12) United States Patent
Eggleston et al.

(10) Patent No.: US 9,515,980 B2
(45) Date of Patent: *Dec. 6, 2016

(54) SCALED DOMAIN NAME SERVICE (71) Applicant: Limelight Networks, Inc., Tempe, AZ (US)

(72) Inventors: Jason Eggleston, Newport Beach, CA (US); Nils H. McCarthy, Seattle, WA (US); Bradley B. Harvell, Chandler, AZ (US); Mohan I. Kokal, Peoria, AZ (US); Lee A. Stafford, Phoenix, AZ (US); Gary S. Baldus, Scottsdale, AZ (US); Michael M. Gordon, Paradise Valley, AZ (US); Nathan F. Raciborski, Phoenix, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/171,140

(22) Filed: Feb. 3, 2014

(65) Prior Publication Data

US 2014/0297870 A1 Oct. 2, 2014

Related U.S. Application Data

(63) Continuation of application No. 13/595,780, filed on Aug. 27, 2012, now Pat. No. 8,782,279, which is a (Continued)

(51) Int. Cl.
*G06F 15/16* (2006.01)
*H04L 29/12* (2006.01)
(Continued)

(52) U.S. Cl.
CPC ..... *H04L 61/1511* (2013.01); *H04L 29/08072* (2013.01); *H04L 61/2007* (2013.01)

(58) Field of Classification Search
USPC ................ 709/203, 217, 223–229, 245, 250
See application file for complete search history.

(56) References Cited

U.S. PATENT DOCUMENTS 6,553,413 B1 4/2003 Leighton et al.
7,574,499 B1 8/2009 Swildens et al.
(Continued)

FOREIGN PATENT DOCUMENTS

EP 1157524 B1 12/2007

OTHER PUBLICATIONS

Novella Bartolini et al, "A Walk through Content Delivery Networks", Retrieved on Apr. 15, 2014 from http://wwwusers.di.uniroma1.it/~novella/articoli/CDN_tutorial.pdf, 25 pages, Universita di Roma.

(Continued)

*Primary Examiner* — Zarni Maung
(74) *Attorney, Agent, or Firm* — Snell & Wilmer, LLP (57) ABSTRACT

A method or system for transferring information during the domain name service (DNS) lookup to more effectively utilizing the content delivery network (CDN) is disclosed. Information gathered from DNS request is used to identify information on how to serve the content with a chosen IP address returned from the DNS lookup. The DNS server selects from a number of possible IP addresses after analyzing information from the DNS request and popularity of associated content. The different IP addresses will result in different edge servers providing content. An IP address could be provided for popular content in a way that will tend to populate more content caches from the pool of edge servers in one embodiment.

18 Claims, 8 Drawing Sheets

Related U.S. Application Data continuation of application No. 13/397,609, filed on Feb. 15, 2012, now Pat. No. 8,291,117, application No. 14/171,140, which is a continuation-in-part of application No. 13/732,819, filed on Jan. 2, 2013, now Pat. No. 8,645,539, which is a continuation of application No. 13/462,899, filed on May 3, 2012, now Pat. No. 8,380,851, which is a continuation of application No. 12/726,840, filed on Mar. 18, 2010, now Pat. No. 8,195,837, which is a continuation of application No. 11/530,790, filed on Sep. 11, 2006, now Pat. No. 7,707,314, which is a continuation-in-part of application No. 11/284,493, filed on Nov. 21, 2005, now abandoned, application No. 14/171,140, which is a continuation-in-part of application No. 13/848,863, filed on Mar. 22, 2013, now Pat. No. 8,769,118, which is a continuation of application No. 13/568,889, filed on Aug. 7, 2012, now Pat. No. 8,417,824, which is a continuation of application No. 13/347,387, filed on Jan. 10, 2012, now Pat. No. 8,250,219, which is a continuation of application No. 13/209,182, filed on Aug. 12, 2011, now Pat. No. 8,117,319, which is a continuation of application No. 12/645,041, filed on Dec. 22, 2009, now Pat. No. 8,024,468, which is a continuation of application No. 11/539,106, filed on Oct. 5, 2006, now Pat. No. 7,730,187.

(51) Int. Cl.
*H04L 29/08* (2006.01)
*G06F 12/00* (2006.01)

(56) References Cited

U.S. PATENT DOCUMENTS

| | | | | |
|---|---|---|---|---|
| 7,707,314 | B2* | 4/2010 | McCarthy | H04L 29/12066 709/217 |
| 7,730,187 | B2* | 6/2010 | Raciborski | H04L 29/12066 709/201 |
| 7,970,940 | B1 | 6/2011 | Ven et al. | |
| 8,024,468 | B2* | 9/2011 | Raciborski | H04L 29/12066 709/217 |
| 8,041,809 | B2 | 10/2011 | Sundaram et al. | |
| 8,117,319 | B2* | 2/2012 | Raciborski | H04L 29/12066 709/217 |
| 8,195,837 | B2* | 6/2012 | McCarthy | H04L 29/12066 709/217 |
| 8,250,219 | B2* | 8/2012 | Raciborski | H04L 29/12066 709/217 |
| 8,285,870 | B2 | 10/2012 | Taylor et al. | |
| 8,291,117 | B1* | 10/2012 | Eggleston | H04L 61/2007 709/245 |
| 8,380,851 | B2* | 2/2013 | McCarthy | H04L 29/12066 709/217 |
| 8,417,824 | B2* | 4/2013 | Raciborski | H04L 29/12066 709/217 |
| 8,423,672 | B2 | 4/2013 | Liu et al. | |
| 8,521,908 | B2 | 8/2013 | Holmes et al. | |
| 8,645,539 | B2* | 2/2014 | McCarthy | H04L 29/12066 709/217 |
| 8,769,118 | B2* | 7/2014 | Raciborski | H04L 29/12066 709/217 |
| 8,782,279 | B2* | 7/2014 | Eggleston | H04L 61/2007 709/245 |
| 2004/0073596 | A1 | 4/2004 | Kloninger et al. | |
| 2007/0055764 | A1* | 3/2007 | Dilley | H04L 29/06 709/223 |

OTHER PUBLICATIONS

Ingmar Poese et al, "Improving Content Delivery Using Provider-aided Distance Information", Retrieved on Apr. 16, 2014 from http://www.net.t-labs.tu-berlin.de/papers/PFASF-ICDUPADI-10.pdf, 13 pages.

* cited by examiner

SCALED DOMAIN NAME SERVICE

CROSS-REFERENCES TO RELATED APPLICATION

This application claims the benefit of priority to, and is a continuation of U.S. patent application Ser. No. 13/595,780, filed Aug. 27, 2012, entitled "SCALED DOMAIN NAME SERVICE," which is a continuation of U.S. patent application Ser. No. 13/397,609, filed Feb. 15, 2012, entitled "SCALED DOMAIN NAME SERVICE," now U.S. Pat. No. 8,291,117. This application also claims the benefit of priority to, and is a continuation-in-part of, U.S. patent application Ser. No. 13/732,819, filed Jan. 2, 2013, entitled "DOMAIN NAME RESOLUTION RESOURCE ALLOCATION," which is a continuation of U.S. patent application Ser. No. 13/462,899, filed May 3, 2012, entitled "DOMAIN NAME RESOLUTION RESOURCE ALLOCATION," now U.S. Pat. No. 8,380,851, which is a continuation of U.S. patent application Ser. No. 12/726,840 filed Mar. 18, 2010, entitled "DOMAIN NAME RESOLUTION RESOURCE ALLOCATION," now U.S. Pat. No. 8,195,837, which is a continuation of U.S. patent application Ser. No. 11/530,790, filed Sep. 11, 2006, entitled "DOMAIN NAME RESOLUTION RESOURCE ALLOCATION," now U.S. Pat. No. 7,707,314, which is a continuation-in-part of U.S. patent application Ser. No. 11/284,493, filed Nov. 21, 2005, entitled "DOMAIN NAME RESOLUTION BASED DYNAMIC RESOURCE ASSIGNMENT." This application also claims the benefit of priority to, and is a continuation-in-part of, U.S. patent application Ser. No. 13/848,863, filed Mar. 22, 2013, entitled "DOMAIN NAME SERVICE RESOLVER," which is a continuation of U.S. patent application Ser. No. 13/568,889, filed Aug. 7, 2012, entitled "DOMAIN NAME SERVICE RESOLVER," now U.S. Pat. No. 8,417,824, which is a continuation of U.S. application Ser. No. 13/347,387, filed on Jan. 10, 2012, entitled "DOMAIN NAME SERVICE RESOLVER," now U.S. Pat. No. 8,250,219, which is a continuation of U.S. application Ser. No. 13/209,182, filed on Aug. 12, 2011, entitled "DOMAIN NAME SERVICE RESOLVER," now U.S. Pat. No. 8,117,319, which is a continuation of U.S. application Ser. No. 12/645,041, filed on Dec. 22, 2009, entitled "DOMAIN NAME SERVICE RESOLVER," now U.S. Pat. No. 8,024,468, which is a continuation of U.S. application Ser. No. 11/539,106, filed on Oct. 5, 2006, entitled "REMOTE DOMAIN NAME SERVICE," now U.S. Pat. No. 7,730,187. The above-identified patent applications are incorporated by reference in their entireties for all purposes.

BACKGROUND

This disclosure relates in general to a content delivery network (CDN) and, but not by way of limitation, to transferring information during the domain name service (DNS) lookup to more efficiently utilize the CDN.

CDNs are used to offload content delivery from an origin server. CDNs have geographically distributed points of presence (POPs) to locate edge servers close to end users. CDNs are capable of delivering content in high demand with higher levels of quality of service (QoS). Content is requested by universal resource locator (URL) from a CDN. Various techniques are used to route a URL request to a nearby POP, for example, by DNS lookup, request redirection, request routing, and/or Anycast.

DNS is used to translate a domain name to an Internet protocol (IP) address. An IP address is required to request content on a server. Domain names are typically easy to remember words that are organized by top-level domain (TLD) label. DNS lookups follow a series of steps until an authoritative DNS is found that actually returns the IP address for a hostname (i.e., a domain and subdomain(s) combination). Software such as the open source Berkeley Internet Name Domain (BIND) server will perform DNS lookups.

URLs include one or more hostnames followed by a TLD. The hostname includes a domain label on the right with any number of subdomain labels. The TLD label is the top level of a hierarchy dividing the namespace of the Internet. Each branch down from the TLD is a domain that may further branch and further branch with any number of levels of subdomains. The tree of the hierarchy can have up to 127 levels with each domain or subdomain containing 63 characters. The hostname is used to find an IP address of a server, but the DNS is never given any information on the content that might ultimately be requested from the IP address.

SUMMARY

In one embodiment, the present disclosure provides for transferring information during the domain name service (DNS) lookup to more effectively utilize the content delivery network (CDN). Information gathered from the hostname is used to identify information on how to serve the content with a chosen IP address returned from the DNS lookup. The DNS server selects from a number of possible IP addresses after analyzing information from the hostname. The different IP addresses will result in different edge servers providing content. Things such as the identity of a content object, popularity of the content object, level of quality of service (QoS), location of a requesting computing device, characteristics of the computing device, information for a user of the computing device, characteristics of the content object, transaction identification, and/or digital rights management (DRM) information can affect which IP address is chosen by the DNS server. For example, an IP address could be provided for popular content in a way that will tend to populate more content caches from the pool of edge servers.

In another embodiment, a CDN for delivering content to computing devices is disclosed. A number of points of presence (POPs) is dispersed geographically with respect to each other, each of the number of POPs includes a number of content caches. A DNS assists in resolving addresses used for delivering content. The DNS analyzes a first parameter in a first DNS request to return a first IP address to a first computing device. The DNS analyzes a second parameter in a second DNS request to return a second IP address to a second computing device. The first and second DNS requests are for a content object. The DNS determines popularity of the content object. The first and second IP addresses are chosen as a function of popularity. The first and second IP addresses result in the CDN serving the content object from two different content caches of the plurality of content caches.

In another embodiment, a method for DNS that assists in resolving addresses used for delivering content from a CDN to computing devices is disclosed. A DNS request is received at a server from a computing device. The DNS request includes a domain field and additional information. The server is an authoritative DNS for the domain. The additional information is analyzed to choose an IP address from a plurality of IP addresses for the CDN. The additional information indicates a content object. The IP address corresponds to a plurality of edge servers in two or more POPs. The IP address is chosen from a plurality of options based, at least in part, upon popularity of the content object associated with the DNS request. The plurality of edge servers each are assignable to serve content associated with the DNS request. The IP address is sent from the server for the IP address to answer the DNS request.

In one embodiment, a DNS that assists in resolving addresses used for delivering content from a content delivery network (CDN) to computing devices is disclosed. The DNS includes a processor and a memory. The processor is configured to: receive a DNS request at a server from a computing device, wherein the DNS request includes a domain field and additional information; analyze the additional information to choose an Internet protocol (IP) address from a plurality of IP addresses for the CDN, determine popularity of content associated with the DNS request, wherein the IP address corresponds to a plurality of edge servers in two or more POPs, the IP address is chosen as a function of the popularity, and the plurality of edge servers each are assignable to serve content associated with the DNS request; and send the IP address from the server for the IP address to answer the DNS request. The memory is coupled with the processor.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
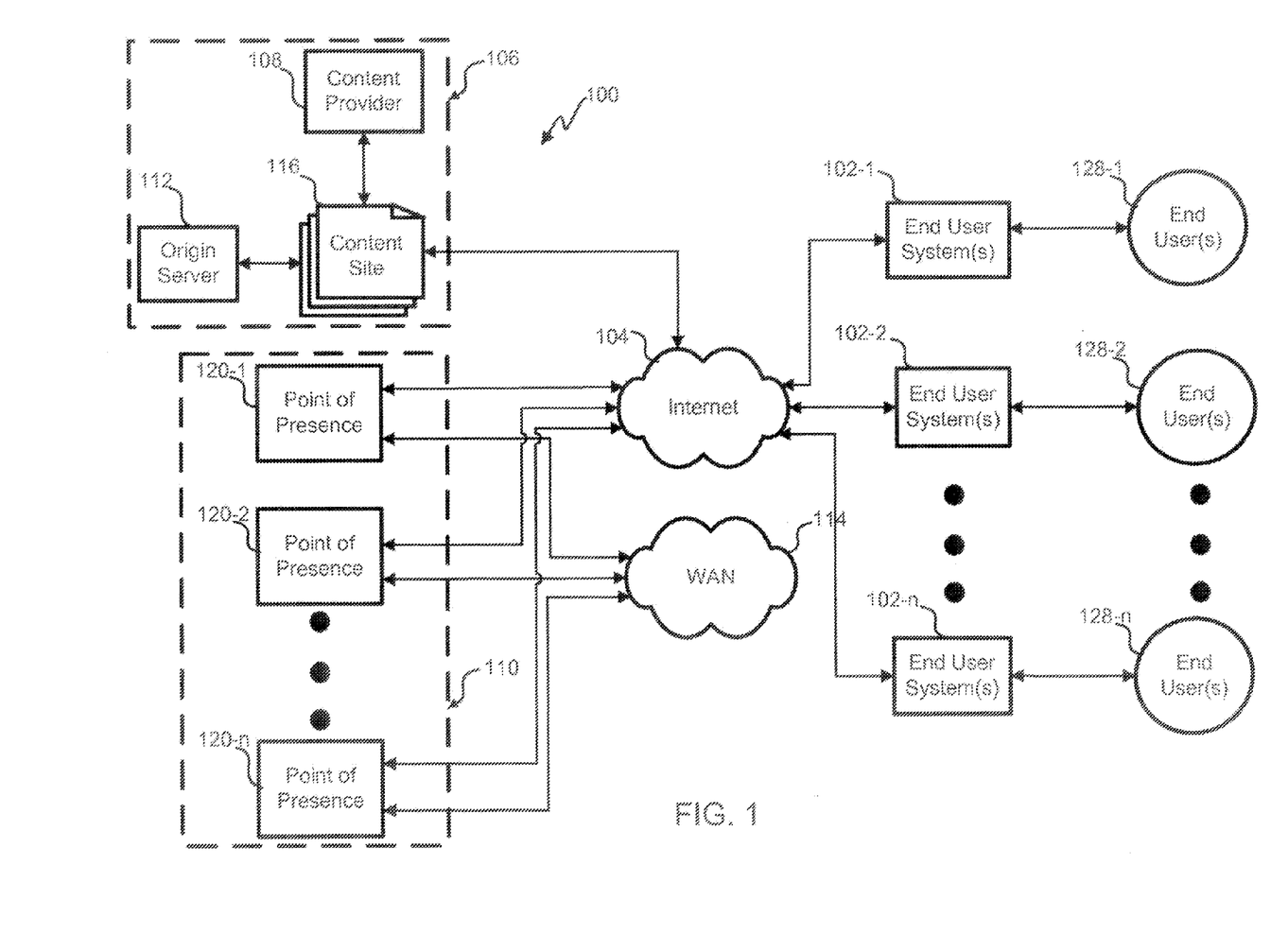
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and includes a content provider 108, a content site 116, and an origin server 112. The CDN 110 can both cache and/or host content in various embodiments for third parties to offload delivery and typically provide better quality of service (QoS) to a broad spectrum of end user systems 102 distributed worldwide.

In this embodiment, the content distribution system 100 locates the content objects (or portions thereof) and distributes the content objects to an end user system 102. The content objects are dynamically cached and/or hosted within the CDN 110. A content object is any content file or content stream and could include, for example, video, pictures, data, audio, software, analytics, and/or text. The content object could be live, delayed or stored. Throughout the specification, references may be made to a content object, content, content stream and/or content file, but it is to be understood that those terms could be used interchangeably wherever they may appear.

Many content providers 108 use a CDN 110 or even multiple CDNs 110 to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end user systems 102 in a network sense. Routing requests between the multiple POPs is done during the DNS resolution and refined by assignment of the edge server after request for the content in this embodiment. Other embodiments use routing, redirection, Anycast, DNS assignment and/or other techniques to locate the particular edge server that will provide content to an end user 128. In addition to the Internet 104, a wide area network (WAN) and/or local area network (LAN) 114 or other backbone may couple the POPs 120 with each other and also couple the POPs 120 with other parts of the CDN 110.

When an end user 128 requests a web page through its respective end user system 102 while browsing, the request for the web page is passed either directly or indirectly via the Internet 104 to the content originator 106. The content originator 106 is the source or re-distributor of content objects. The content site 116 is an Internet web site accessible by the end user system 102. In one embodiment, the content site 116 could be a web site where the content is viewable with a web browser. In other embodiments, the content site 116 could be accessible with application software or customized hardware other than a web browser, for example, a set top box, a content player, video streaming appliance, a podcast player, etc. The content provider 108 directs content requests to a CDN 110 after they are made or formulates the delivery path by embedding the delivery path into the universal resource indicators (URIs) for a web page. In any event, the request for content is handed over to the CDN 110 in this embodiment by having the end user system 102 perform a DNS look-up to choose where to request content from two or more POPs 120.

The request for a content object is passed to a particular POP 120 of the CDN 110 corresponding to the IP address returned in the DNS look-up. The POP 120 will pass the request to an assignment master function running on an edge server. The assignment master decides which edge server will actually serve the request and forward the request to that edge server. The assignment master may select from edge servers in the current POP and/or in multiple POPs. Edge servers that can be assigned a request by the assignment master are divided by namespace using, for example, a cache array routing protocol (CARP) algorithm, but other embodiments could use other algorithms to predictably divide requests across edge servers in any manner. Generally, requests for the same content file are all given by the assignment master to the same edge server so that edge servers across the CDN 110 are utilized efficiently to serve a particular piece of content multiple times.

Through use of a hierarchy of assignment master servers, popular content is replicated more often across the POPs 120 and their edge servers. Less popular content is cached or stored on less edge servers. Where a DNS query resolves to an assignment master higher in the hierarchy, the request is assigned against a broader pool of edge servers such that fewer resources of the CDN 110 are consumed presumably because it was determined that the content was less popular. Assignment masters lower in the hierarchy are used for popular content to increase the likelihood that an edge server nearby the end user system 102 fulfills the request.

The particular edge server may retrieve the portion of the content object from the content provider 108. Alternatively, the content provider 108 may directly provide the content object to the CDN 110 and its associated POPs 120 through prepopulation, i.e., in advance of the first request. The CDN servers include edge servers in each POP 120 that actually serve end user requests. The origin server 112 holds a copy of each content object for the content originator 106. Periodically, the content of the origin server 112 may be reconciled with the CDN 110 through a cache, hosting and/or pre-population algorithm. Some content providers could use an origin server within the CDN 110 to host the content and avoid the need to maintain a copy.

Once the content object is retrieved from the origin server 112, the content object is stored within the particular POP 120 and is served from that POP 120 to the end user system 102. The end user system 102 receives the content object and processes it for use by the end user 128. The end user system 102 could be a personal computer, media player, tablet computer, handheld computer, Internet appliance, phone, IPTV set top, video stream player, streaming radio or any other device that receives and plays content objects. In some embodiments, a number of the end user systems 102 could be networked together. Although this embodiment only shows a single content originator 106 and a single CDN 110, it is to be understood that there could be many of each in various embodiments. Additionally, some embodiments could have multiple CDNs 110, where a content originator 106 could have a captive CDN 110 optionally used for its content or not when a third-party CDN is used to shed requests.

Figure 2:
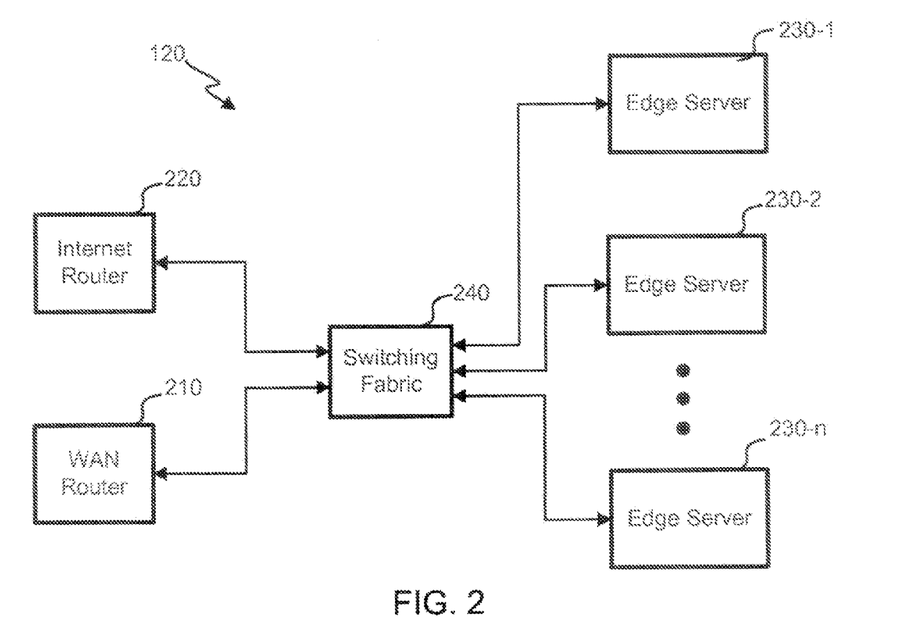
FIG. 2 depicts a block diagram of an embodiment of a point of presence (POP) that is part of a content delivery network (CDN)

With reference to FIG. 2, a block diagram of an embodiment of a POP 120 is shown that is part of a CDN 110. Although only one POP 120 is depicted, there are a number of POPs 120 similarly configured and geographically distributed throughout the CDN 110. The POPs 120 communicate through a WAN router 210 and/or an Internet router 220 when locating content objects. An interface to the Internet 104 from the POP 120 accepts requests for content objects from end user systems 102. The request comes from an Internet protocol (IP) address in the form of a URI.

Edge servers 230 are made with general purpose computers loaded with software to perform various functions for the CDN 110. The edge servers 230 could be rack mounted or arranged in clusters. Multiple hardware processors and storage media could be used to implement each edge server 230. Each edge server 230 can load multiple instances of the same software and/or a variety of software to implement various functionality. For example, software may be used on edge servers to implement switching fabric, routing, cacheing, hosting, DNS lookup, analytics, business rules, delivery assignment, etc. The software instances can scale with loading of the POP 120. Different edge servers 230 may have a different set of functionality as defined by the software instances that are programmed to run on each edge server 230.

Switch fabric 240 assigns the request to one of the edge servers 230 according to a routing scheme such as round robin, load balancing, CARP, random, etc. In this embodiment, the switch fabric is aware of which edge servers 230 have what capabilities and assigns within the group having the capability to store and serve the particular content object referenced in the URI. A protocol such as CARP is used in this embodiment to disperse the URIs between the group of edge servers 230. Every time that a particular URI is requested from the group, it is assigned to the same edge server 230 using CARP. The caches gathered in a particular group as neighbors can be the other servers in the current POP, less loaded servers in the current POP, servers having the capability to process the content object, a subset of servers assigned to a customer using the CDN to serve the content object, or some other grouping of servers in the POP 120.

In another embodiment, the switch fabric 240 assigns the request to one of the edge servers 230, which performs CARP to either service the request or reassign it to a neighboring edge server 230 with software to perform an assignment master function. The switch fabric 240 sends each packet flow or request to an edge server 230 listed in the configuration of the switch fabric 240. The assignment can be performed by choosing the edge server 230 with the least amount of connections or the fastest response time, but the switch fabric 240 in this embodiment assigns the packet flow somewhat arbitrarily using round robin or random methodologies. When the chosen edge server 230 receives the packet flow, an algorithm like CARP is used by the chosen edge server 230 to potentially reassign the packet flow between a group of edge servers to the one dictated by the algorithm. For example, the switch fabric 240 could choose a second edge server 230-2 being the next in the round robin rotation. The second edge server 230-2 would perform CARP on the request and find that the first edge server 230-1 is being assigned this type of request. The request would be reassigned to the first edge server 230-1 to fulfill.

In some cases, the CDN 110 is used to host content for others. Content providers 108 upload content to an edge server 230 who hosts the content to function as an origin server. After the content provider 108 places a content object in the CDN 110 it need not be hosted on the origin server 112 redundantly. Edge servers 230 can perform the hosting function within the CDN 110 with other edge servers 230 perhaps caching the same content that is hosted by another edge server 230.

Requests from end user systems 102 are assigned to an edge server 230 that may cache the requested content object. On occasion, the edge server 230 receiving a request does not have the content object stored and available for immediate serving. This so-called "cache miss" triggers a process within the CDN 110 to effectively find the content object (or portion thereof) while providing adequate QoS. The content may be found in neighboring edge servers 230 in the same POP 120, in another POP 120 or even an external origin server 112. The various edge servers 230 are grouped for various URIs uniquely. In other words, one URI may look to one group of edge servers 230 on a cache miss while another URI will look to a different group of edge servers 230. In various embodiments, a particular URI could be assigned to one or more edge servers 230 in a single POP 120, multiple POPs 120 or even in every POP 120. Generally, more popular content is stored on more edge servers 230 and more POPs 120.

Figure 3A:
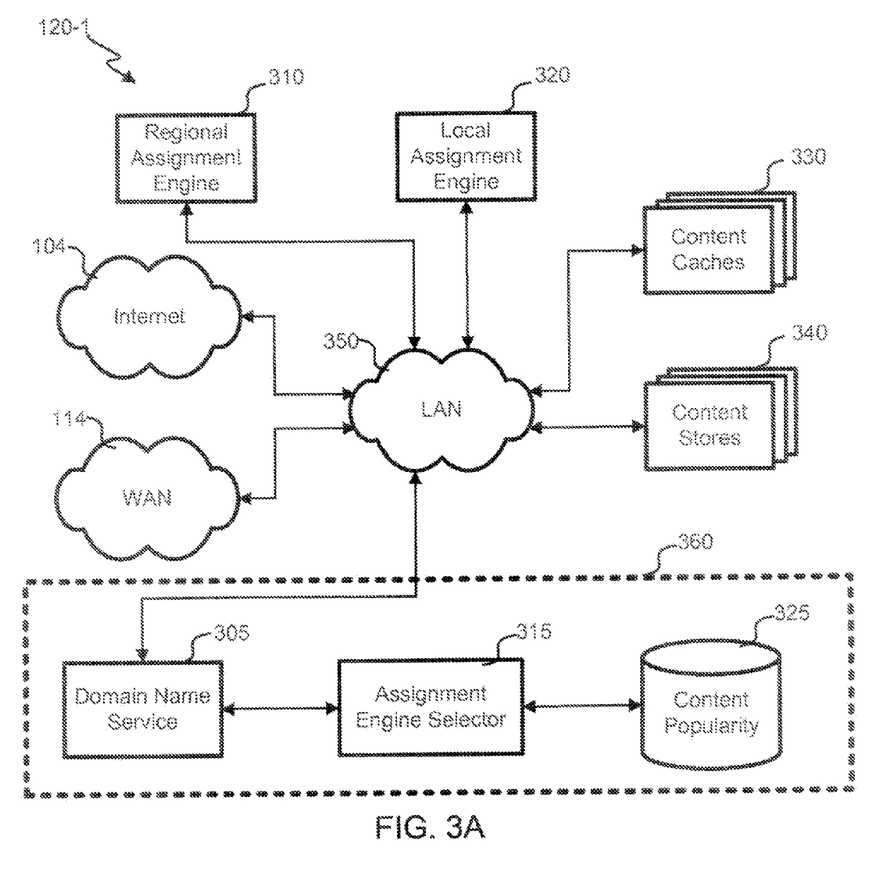
FIGS. 3A and 3B depict functional block diagrams of embodiments of a POP.

Referring next to FIG. 3A, a functional block diagram of an embodiment of a POP 120-1 is shown that uses DNS resolutions to more effectively utilize the CDN 110. The DNS function 360, assignment engines 310, 320, content caches 330, and content stores 340 can be implemented on one or more hardware edge servers 230. The various functions in this block diagram could be performed by one or more instances of software operating on any number of edge servers 230. An edge server 230 could perform multiple functions simultaneously or upon demand. Communication within the POP 120 is over one or more LANs 350 that are functionally connected to the Internet 104 and/or WAN 114.

A vast majority of the edge servers 230 are configured to deliver content in the CDN 110. Content can be hosted from a content store 340 such that the content is retained persistently even if not particularly popular. Algorithms for pre-population and aging away content can be used in the content stores. Content caches 330 are designed store content in demand. When content cannot be found on a chosen content cache 330, it is requested from an external origin server 112 or a content store 340. Various algorithms are used to flush less likely to be requested content from the content cache 330 as new content is added.

The assignment engines 310, 320 have different sets of content caches 330 that are available to assign content requests. A local assignment engine 320 can assign to some or all the content caches 330 in the POP 120. Other embodiments could have multiple local assignment engines 320 that divide the content caches 320 within a POP 120. A regional assignment engine 310 assigns content requests to local assignment engines 320 in two or more POPs. The regional assignment engine 310 could use any predictable algorithm to divide requests between multiple local assignment engines 320.

The assignment engines 310, 320 use CARP, load balancing, round robin, random or some other algorithm to assign the requests. This embodiment uses CARP to assign requests which divides the namespace of content requests predictably between a group of content caches. For example, where there five content caches 330, a particular request for content will resolve to the same content caches 330 in the group of five every time to focus all the requests to the same source. Other embodiments could use any algorithm that predictably assign the request for the same content to the same content caches 330.

The DNS function 360 translates hostnames into IP addresses. Not every POP 120 in the CDN 110 may have a DNS function 360 with only one or a subset being configured to DNS lookups. Through the DNS process, one of the assignment engines 310, 320 in one of the many POPs 120 is chosen by returning the IP address to the selected assignment engine 310, 320. Logic is used to choose an assignment engine that will result in adequate QoS for delivery of a piece of content across the CDN 110.

In this embodiment, the DNS function 360 includes a DNS 305, an assignment engine selector 315 and content popularity store 325. The DNS function 360 is authoritative for domains associated with the CDN 110. The DNS function 360 receives a content identifier (ID) for the content that will ultimately be requested as a subdomain and passes that information to the assignment engine selector 315. The content ID is used by the assignment engine selector 315 to query the content popularity store 325 to determine the popularity of the content associated with the content ID. The content popularity store is updated with how often content objects are requested in different parts of the CDN 110. Popularity could be gathered as analytics internal to the CDN, from the content originator 106 and/or reports from end user systems 102 in various embodiments.

The more popular a content object, the more edge servers 230 that are allocated by the assignment engine selector 315 to serve the content. Engaging more edge servers 230 is done by picking local assignment engines 320 near the presumed location of the end user system 102 making the request. Choosing a regional assignment engine 310 will choose a single content cache 330 between multiple POPs 120 such that only one content cache for those multiple POPs 120 is likely to cache the content. Assignment engines 310, 320 can be arranged in any number of tiers in a hierarchy to accomplish any granularity of assignment of requests.

The DNS function ultimately returns an IP address according to the analysis performed with the assignment engine selector 315. The returned IP address can be specific to analysis for a particular content object, content player, content originator 106, and/or end user. A DNS resolution can include a time-to-live value that specifies how long the hostname should reliably be associated with the returned IP address. Some DNS caches will use the IP address for multiple DNS request and multiple content objects. A time-to-live of zero can be returned to indicate that the DNS resolution should not be cached for other requests in one embodiment.

Figure 3B:
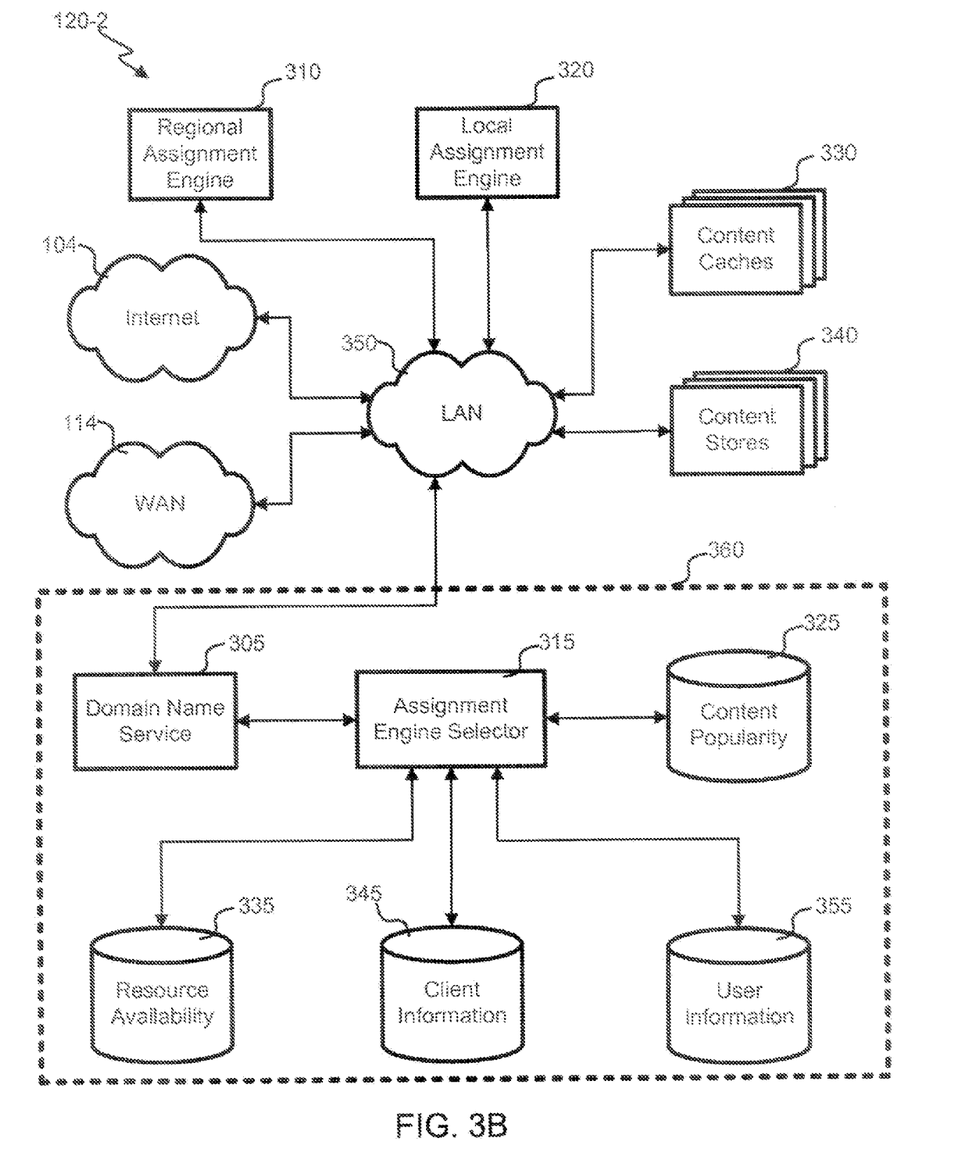

With reference to FIG. 3B, a functional block diagram of an embodiment of a POP 120-2 is shown that uses DNS resolutions to more effectively utilize the CDN 110. This embodiment uses a more sophisticated DNS function 360 than the embodiment of FIG. 3A. In addition to a content popularity store 325, there is a resource availability store 335, a client information store 345, and a user information store 355. The additional information is used to determine the group of content caches 330 that will be used by the assignment engine 310, 320 to find the content cache 330 that will ultimately be chosen. Regional assignment engines 310 are generally used by less popular content and local assignment engines 320 are used for popular content.

The resource availability store 335 is used to choose assignment engines 310, 320. The resource availability 110 within the CDN 110 could be updated periodically to reflect overloading, lost packets, broken systems, offline equipment, resource overload, etc. for the edge servers and other equipment. Where resources are scarce to serve the associated content object in a group of content caches 330, the associated assignment engine 310, 320 is avoided. For example, a natural disaster on the West Coast could be causing POPs 120 in California to be overloaded with content caches 330 not operating effectively. An end user system 102 in Los Angeles could do a DNS request to the DNS function 360 for a large piece of content. Based upon information gathered from the resource availability store 335, a local assignment engine 320 for the Denver POP 120 could be chosen because it is less effected by the increased utilization of the CDN 110 on the West Coast where there was the natural disaster. Should the content requested not be popular, the DNS function 360 could instead assign the request to a regional assignment engine 320 that includes all the content caches 330 in the several Mountain-West POPs 120.

The client information store 345 has information related to customers who use the CDN 110 to deliver content. Once the content object is known, the client associated with the content object can be determined. Client information 345 could be used to provide varying levels of QoS, to choose a POP 120 with less expensive network connectivity to the origin server 112, or to choose POPs 120 nearby the origin server 112 for the content. For example, some clients could negotiate a level of QoS that would tend to use more content caches 330 such that end users 128 experienced higher quality QoS with thinly loaded edge servers 230 that are nearby. In another example, the location of the end user computer 102 may be near several POPs 120 such that the location of the origin server 112 is used to pick the POP 120 that is both close to the origin server 112 and the end user system 102.

The user information store 355 has data on end users 128 and their end user computers 102. Information such as bandwidth to the end user computer 102 and other loading information, computing power or capability of the end user computer 102, actual location for the end user computer 102 with respect to the CDN 110, bandwidth and latency of the Internet connection of the end user 128, or enhanced QoS level for the end user 128. For example, some end users 128 could join a tier of service that will always use local assignment engines 320 nearby the end user computer 102 to provide enhanced QoS. In another example, the actual location for the end user computer 102 could be known and the nearest POP 120 in a physical or network sense would have its local assignment engine 320 chose for determining the actual edge server 230.

Figure 4:
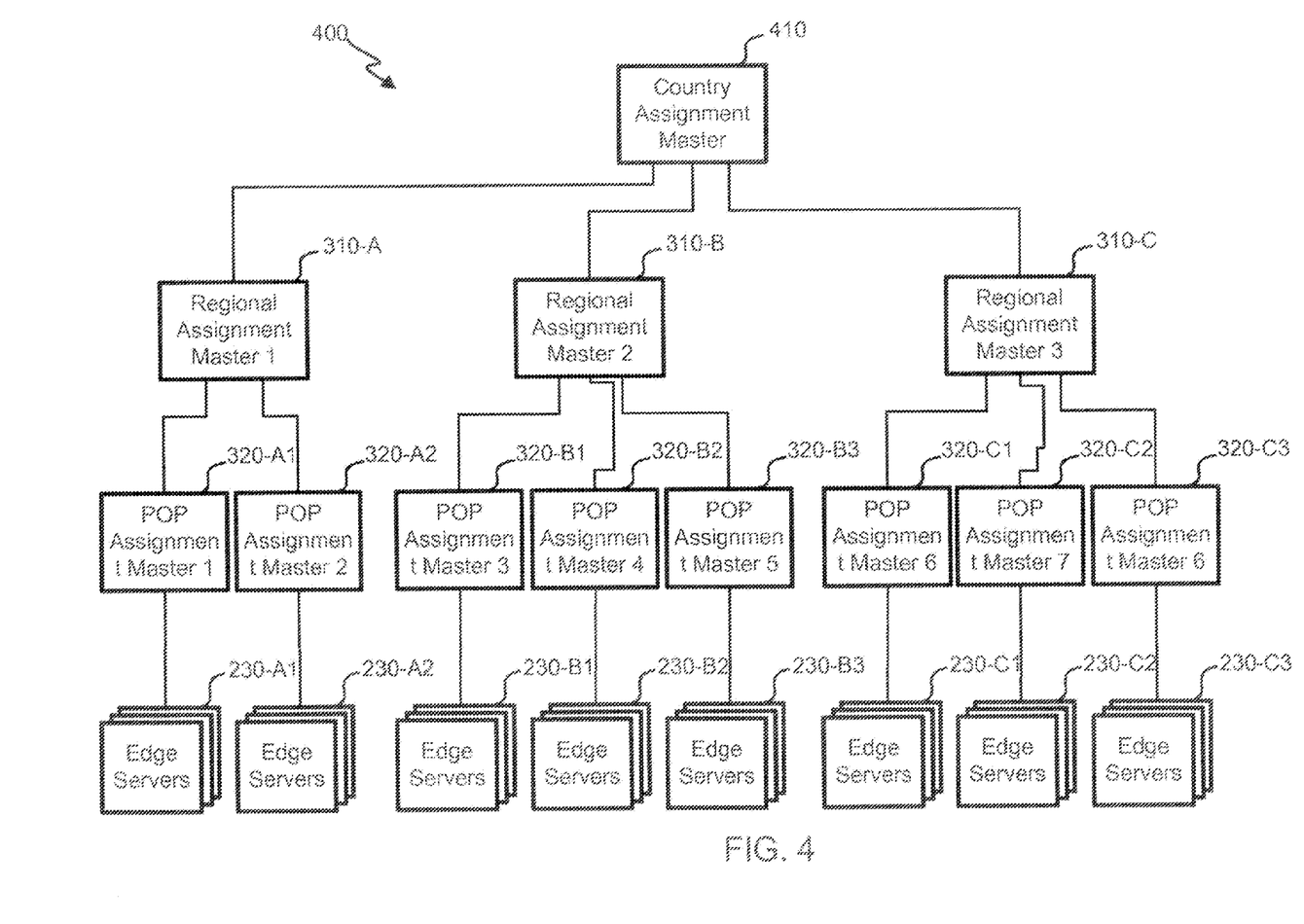
FIG. 4 depicts a block diagram of an embodiment of a hierarchy for assigning edge servers.

Referring next to FIG. 4, a block diagram of an embodiment of a hierarchy 400 for assigning edge servers 230 is shown. This embodiment has three tiers in the hierarchy 400. Each tier can have a number of assignment masters 410, 310, 320. Each assignment master 410, 310, 320 functions on a hardware server in a POP 110. A particular POP 120 will have a POP assignment master 320, and possibly a regional assignment master 310 and/or country assignment master 410. An instance of an assignment master 410, 310, 320 could run on an edge server 230 in addition to other functions that could be performed by that edge server 230.

Each tier divides the content requests among themselves. For example, the country assignment master 410 will choose one of the regional assignment masters 310 for a particular content request in a repeatable fashion. A hash of the URI in the request is used in this embodiment to divide the URI namespace between the three regional assignment masters 310 where each takes one third of the namespace. The namespace need not be evenly divided in a tier with the higher-tier assignment master deciding how to best divide the namespace among its options in the lower-tier.

Assignment of requests to a lower tier can be done in at least two ways. A first embodiment recursively passes the request down to lower tiers until an edge server 230 is ultimately chosen by the lowest tier. This could be done by routing the request or redirecting the request. For example, the country assignment master 410 could be chosen from a number in the highest tier. The first regional assignment master 310-A could be passed the request by the country assignment master 410. The first regional assignment master 310-A would choose one of two POP assignment masters 320-A, for example the second POP assignment master 320-A2 could be passed the request. The second assignment master 320-A2 would choose from the multiple edge servers 230-A2 in its POP 120 and pass the request to the chosen edge server 230 for the content cache 330 function that would service the request.

In another embodiment, assignments of requests is done by one or more assignment masters 410, 310, 320 that each know all the edge servers 230 below it in the hierarchy. Each assignment master 410, 310, 320 would then divide the name space for that group of edge servers 230. The request would be passed directly from the chosen assignment master 410, 310, 320 to the edge server 230 selected. Passing of a request is only performed once from assignment master 410, 310, 320 to edge server 230 in this embodiment and could be done by routing or redirection.

In the highest level tier, there are multiple country assignment masters 410 (although this embodiment only shows a single country assignment master 410). Should a DNS lookup provide the IP address of the country assignment master 410, one edge server 230 in the entire country would be chosen to deliver the particular content object requested. The edge servers 230 available for assignment are all those connected by a line in the tree to the assignment master assigning the request. Other embodiments could have a higher-level tier for the entire CDN 110 which would assign a request to one edge server in the entire CDN 110. An even higher tier that selects between multiple CDNs 110 could be implemented in some embodiments.

The tier below the country assignment master 410 in this embodiment includes a number of regional assignment masters 310. A regional assignment master 310 can assign requests to edge servers 230 in at least two POPs 120. For example, second regional assignment master 310-B can assign requests to the third, fourth and fifth POP assignment masters 320-B and their corresponding edge servers 230-B. The regional assignment masters 310 are associated with POPs 120 clustered (in a geographical or network topology sense) around the regional assignment master 310. For example, there could be a regional assignment master 310 in Phoenix that can assign requests to the POPs in Las Vegas, Phoenix and Tucson.

In the hierarchy 410, the next tier below the regional assignment master 310 is the POP assignment master 320. Each POP 120 has a POP assignment master 320 in this embodiment. The POP assignment master 320 divides the URI namespace between the edge servers 230 grouped in that POP 120. For example, the sixth POP assignment master 320-C1 assigns request to the group of edge servers 230-C1 directly below it in the hierarchy 400.

Some embodiments could have a tier of assignment masters below the POP assignment master 320. Edge servers 230 could be specialized to only serve certain content or tasks because of software and/or licensing issues. For example, only a subset of the edge servers 230 in a POP 120 could be capable of streaming Quicktime™ video. The various functions in the POP 120 could divide the edge servers 230 into sub-groups that are each managed by a function assignment master. A request for a specialized function would be recognized by the POP assignment master 230 and passed to the one or more function assignment masters in the POP that can process that function. The function assignment master would divide requests by namespace to the edge servers 230 in the sub-group with that capability.

Figure 5:
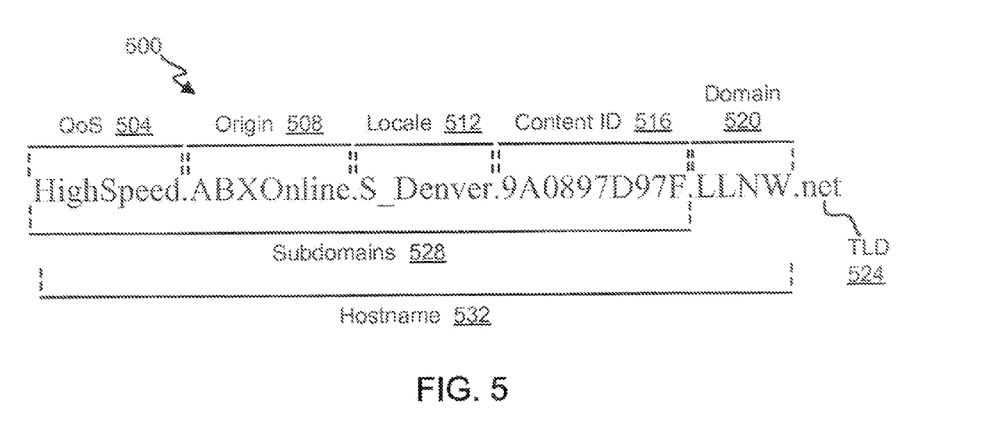
FIG. 5 depicts a diagram of an embodiment of a universal resource locator (URL)

With reference to FIG. 5, a diagram of an embodiment of a URL 500 is shown that embeds additional information into the hostname 532 that is passed to a DNS 305. The end user system 102 could be a media player, for example, that would place information as one or more subdomains 528 to communicate that information to the DNS 305.

In this example, there are four subdomain fields separated by periods, but other embodiments could have multiple fields in each subdomain. Moving right-to-left, the first subdomain includes a content ID field 516 that uniquely identifies the content object that will ultimately be requested. The content ID field 516 could be a hash of the path and filename of the content object or a hash of the content object itself. In other embodiments, the content ID field 516 could indicate the origin server 112, the path and filename for the content object.

Application-layer software on the end user system 102 can determine its location in many cases better than the CDN 110. The locale subdomain 512 could indicate the closest city, region and/or POP 120 in a geographic- or network-sense. The application software could try several POPs 120 and determine the closest in an Internet sense. The locale subdomain 512 would be passed to the DNS 305 such that the nearby POPs 120 could be passed. The origin server domain field 508 includes the origin server 112 that hosts the content object that will be later requested.

The leftmost field indicates a desired level of QoS with the QoS field 504. Embodiments could have multiple levels or tiers of QoS and the QoS field 504 would signal to the DNS 305 the level that is desired. QoS could be modulated by choosing a lower or higher tier in the hierarchy 400 for assigning requests to edge servers 230.

Other embodiments could have any number of fields that pass information from the application layer of the end user system 102 to the DNS 305. The depicted example has four subdomains, but other embodiments could have less or more. With more information on the ultimate content request, the DNS 305 can better make an assignment to the CDN 110 in this embodiment. Other subdomain fields could communicate the unique identifier of the end user system 102, information to select advertizing inserted into the content, identity of the end user 128, configuration of the end user system 128, or application rendering the content; digital rights management (DRM) information or preferences; type of function that the edge server 230 will be asked to perform in the content request; loading, capability or performance of the end user system 102; performance expectation of the Internet connection of the end user system 102; or information gathered at layers below the application layer of the end user system 102.

Figure 6:
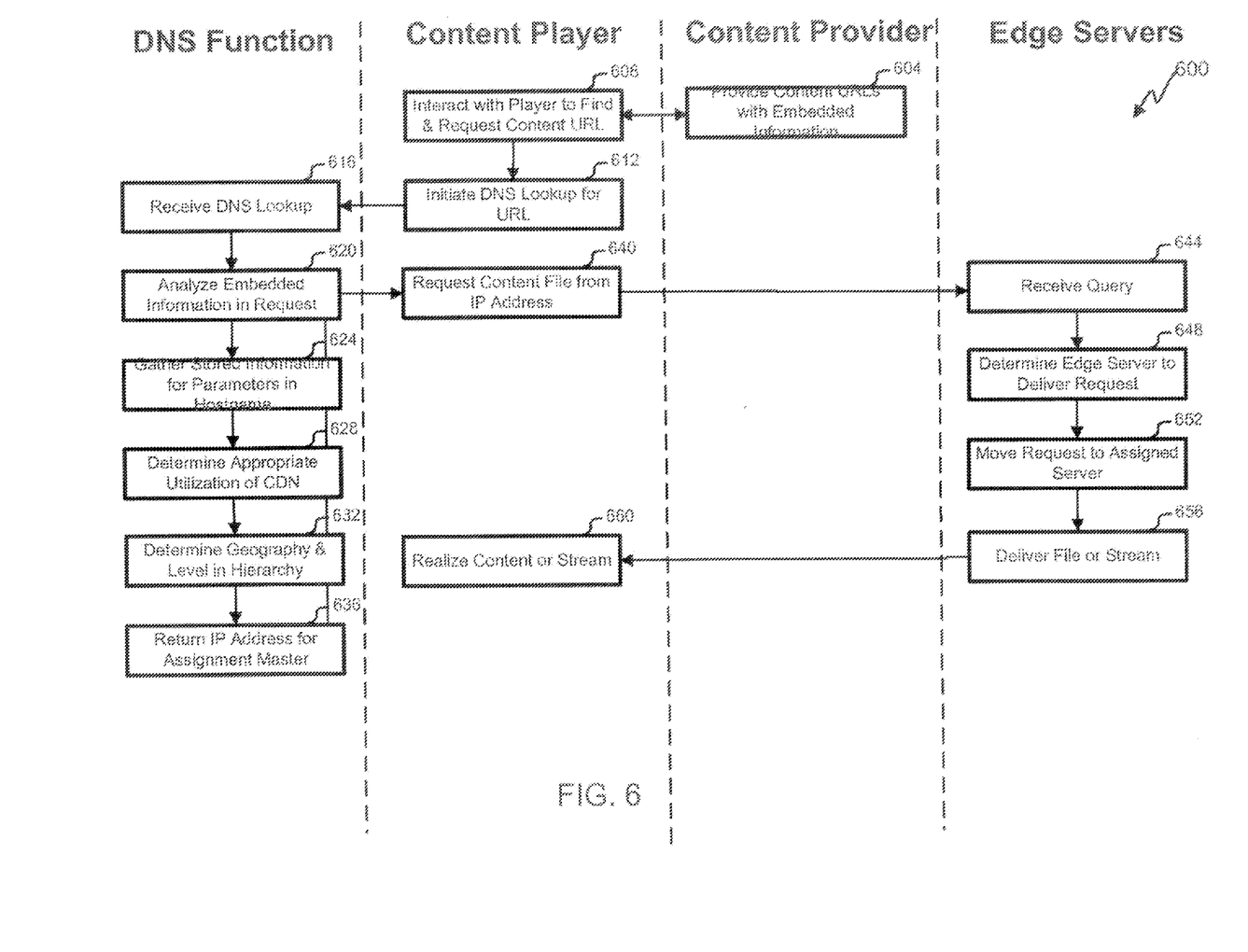
FIG. 6 illustrates a swim diagram of an embodiment of a process for delivering content.

Referring next to FIG. 6, a swim diagram of an embodiment of a process 600 for delivering content is shown. The depicted portion of the process 600 begins at block 604 where content universal content indicators (URIs) or the equivalent are provided. Link, URI, URL, or the equivalent are used interchangeably in this specification to mean anything to specify, expressly or implicitly, the location and identity of content available from a network and/or CDN 110. In one embodiment, a content player or web browser is given a HTML link to the content object. To formulate the link, parameters are added to the link to pass information to the DNS 305 by the content provider 108 in this embodiment. For example, the content provider could formulate the link with the parameters and embed it into a web page of the content site that the end user system 102 renders the web page for the end user to select the links. The parameters can be defined by the content player or any other application on the end user system 102, the content site 116, a content originator 106, a third party ad service, and/or the CDN 110 in various embodiments. Things such as the identity of a content object, popularity of the content object, level of quality of service (QoS), location of a requesting computing device, characteristics of the computing device, information for a user of the computing device, characteristics of the content object, transaction identification, and/or digital rights management (DRM) information could be embedded in the DNS request.

In this embodiment, a content player appliance or application is used by the end user 128 to realize content through interaction in block 608. Links, URLs, URIs or the equivalent correspond to that interaction to allow the end user 128 initiating a request for content. Once a link is requested, the application or appliance performs a DNS lookup to translate the hostname 532 into an IP address in block 612. The DNS process transpires recursively until the DNS function 360 in one of the POPs 120 receives the DNS request in block 616. In this embodiment, there are multiple instances of the DNS function 360 in some or all POPs 120 and a mechanism is used to deliver the DNS request to one DNS function 360, such as the Anycast protocol, for example.

In block 620, the DNS function 360 analyzes the embedded parameters in the hostname 532 to begin the process of choosing an assignment master 410, 310, 320. In this embodiment, the embedded parameters are stored in one or more subdomains 528. In other embodiments, the embedded parameters are passed outside of a traditional DNS request out-of-band or in some modification to the standard DNS request protocol. For example, the EDNS0 extension proposed at http://tools.ietf.org/html/draft-vandergaast-edns-client-ip-01 could be used, for example, which is incorporated by reference herein.

The assignment engine selector 315 queries for information related to the parameters in one or more stores 325, 335, 345, 355 in block 624. The level of the hierarchy 400 is chosen as a function of the desired utilization of the CDN 110, as determined in blocks 628 and 632. For example, popularity of the content object could be used to determine the level of the hierarchy 400 such that popular content uses more cacheing resources than unpopular content. The geography of the content player is used to determine which assignment master 410, 310, 320 to choose from a given tier. The IP address for the chosen assignment master 410, 310, 320 is returned in block 636. In some cases, the geography of the content player is not known so an IP address that would resolve to multiple assignment master 410, 310, 320 in a given tier is returned such that Anycast would decide which of the assignment masters 410, 310, 320 will service the content request.

With an IP address for the hostname 532, the content player requests the content file by IP address, path and/or file or stream name in block 640. An assignment master 410, 310, 320 function running on an edge server 230 receives the query in block 644. An edge server 230 is chosen through a recursive process between assignment masters 410, 310, 320 or by a single assignment master 410, 310, 320 in block 648. The content request is delivered to the assigned edge server 230 chosen by the assignment master(s) 410, 310, 320 in block 652. The assigned edge server 230 delivers the file or stream of content to the content player in block 656. The content player realizes the content in block 660. This process 600 repeats over and over again for multiple pieces of content to more effectively utilize the CDN 110 in this embodiment.

Figure 7:
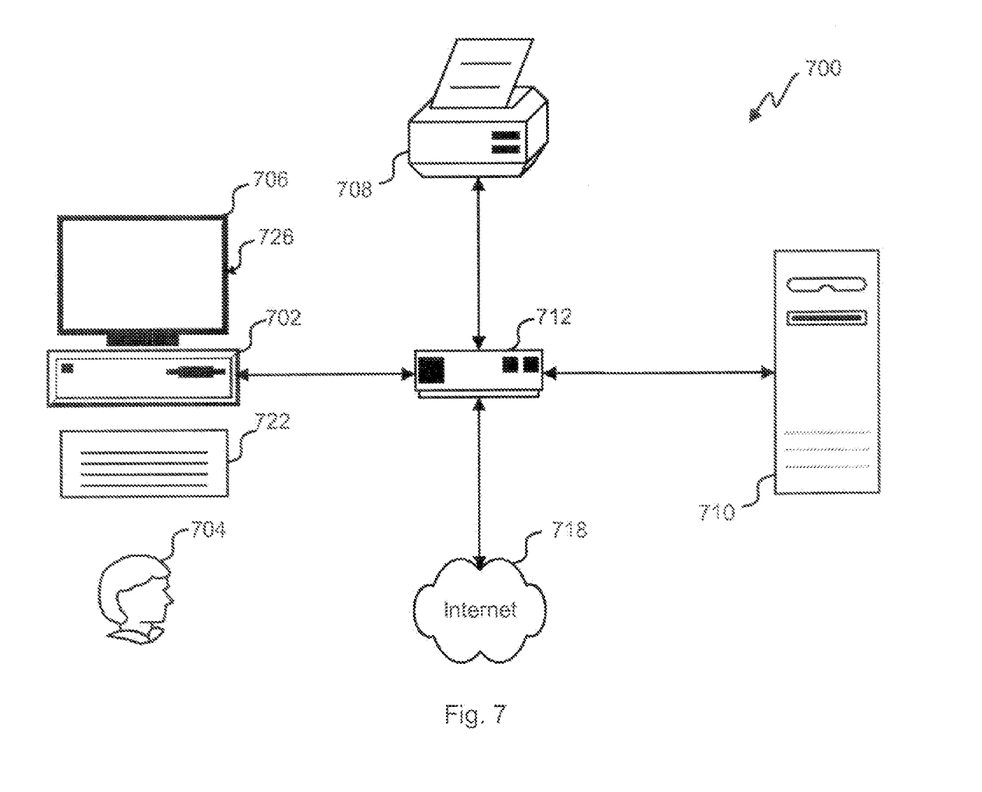
FIG. 7 depicts a block diagram of an embodiment of a computer system.

Referring next to FIG. 7, an exemplary environment with which embodiments may be implemented is shown with a computer system 700 that can be used by a user 704 to program, design or otherwise interact with the computer system 100. The computer system 700 can include a computer 702, keyboard 722, a network router 712, a printer 708, and a monitor 706. The monitor 706, processor 702 and keyboard 722 are part of a computer system 726, which can be a laptop computer, desktop computer, handheld computer, mainframe computer, etc. The monitor 706 can be a CRT, flat screen, etc.

A user 704 can input commands into the computer 702 using various input devices, such as a mouse, keyboard 722, track ball, touch screen, etc. If the computer system 700 comprises a mainframe, a user 704 can access the computer 702 using, for example, a terminal or terminal interface. Additionally, the computer system 726 may be connected to a printer 708 and a server 710 using a network router 712, which may connect to the Internet 718 or a WAN.

The server 710 may, for example, be used to store additional software programs and data. In one embodiment, software implementing the systems and methods described herein can be stored on a storage medium in the server 710. Thus, the software can be run from the storage medium in the server 710. In another embodiment, software implementing the systems and methods described herein can be stored on a storage medium in the computer 702. Thus, the software can be run from the storage medium in the computer system 726. Therefore, in this embodiment, the software can be used whether or not computer 702 is connected to network router 712. Printer 708 may be connected directly to computer 702, in which case, the computer system 726 can print whether or not it is connected to network router 712.

Figure 8:
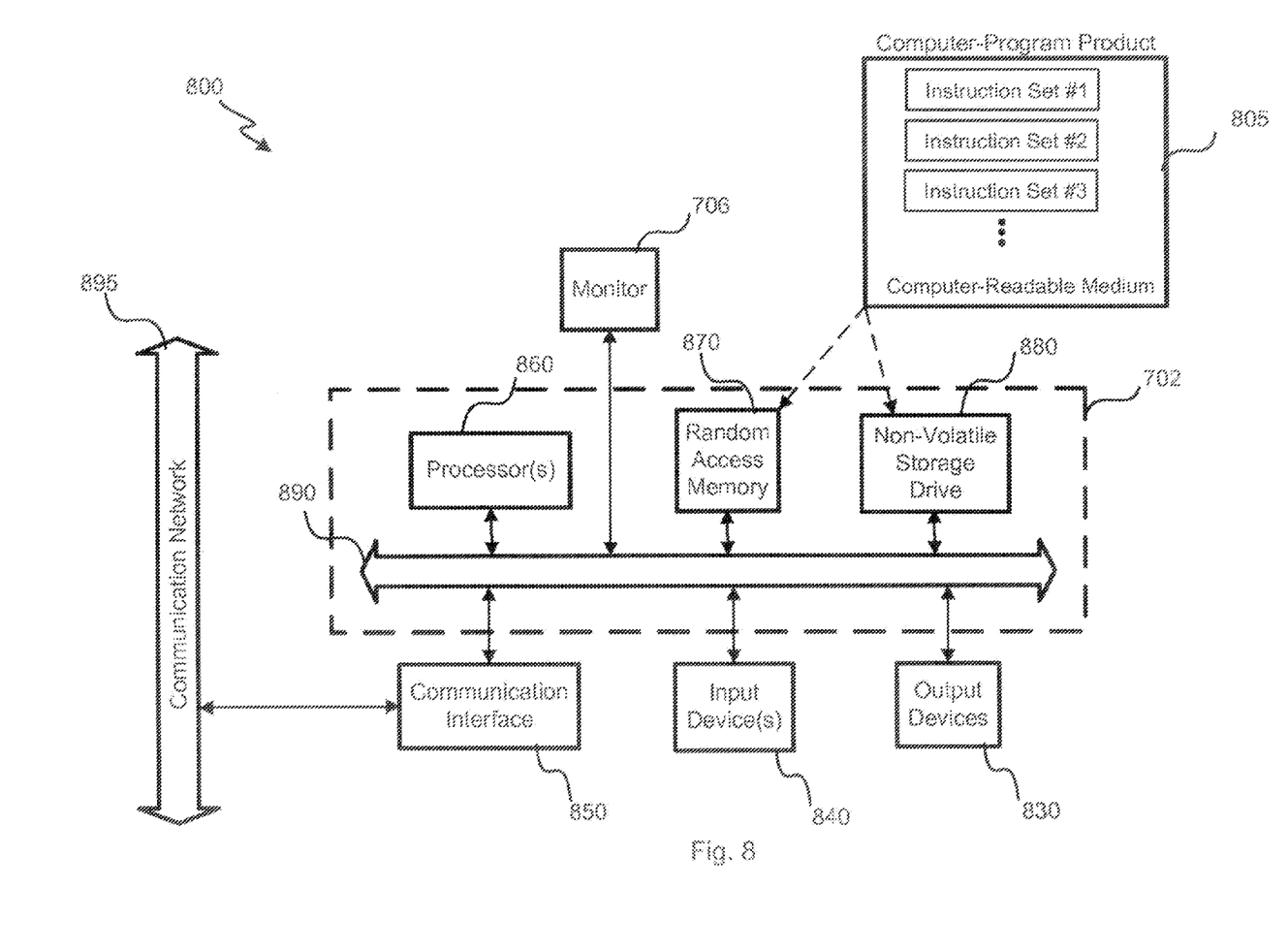
FIG. 8 depicts a block diagram of an embodiment of a special-purpose computer system.

With reference to FIG. 7, an embodiment of a special-purpose computer system 700 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 726, it is transformed into the special-purpose computer system 700.

Special-purpose computer system 700 comprises a computer 702, a monitor 706 coupled to computer 702, one or more additional user output devices 730 (optional) coupled to computer 702, one or more user input devices 740 (e.g., keyboard, mouse, track ball, touch screen) coupled to computer 702, an optional communications interface 750 coupled to computer 702, a computer-program product 705 stored in a tangible computer-readable memory in computer 702. Computer-program product 705 directs system 700 to perform the above-described methods. Computer 702 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 702 and loaded into memory 770. Each processor 760 may comprise a microprocessor, such as a microprocessor from Intel® or Advanced Micro Devices, Inc.®, or the like. To support computer-program product 705, the computer 702 runs an operating system that handles the communications of product 705 with the above-noted components, as well as the communications between the above-noted components in support of the computer-program product 705. Exemplary operating systems include Windows® or the like from Microsoft® Corporation, Solaris® from Oracle®, LINUX, UNIX, and the like.

User input devices 740 include all possible types of devices and mechanisms to input information to computer system 702. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 706 via a command such as a click of a button or the like. User output devices 730 include all possible types of devices and mechanisms to output information from computer 702. These may include a display (e.g., monitor 706), printers, non-visual displays such as audio output devices, etc.

Communications interface 750 provides an interface to other communication networks and devices and may serve as an interface to receive data from and transmit data to other systems, WANs and/or the Internet 718. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 702, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 702 communicate with each other as intended. Although bus subsystem 790 is shown schematically as a single bus, alternative embodiments of the bus subsystem may utilize multiple busses or communication paths within the computer 702.

A number of variations and modifications of the disclosed embodiments can also be used. For example, embodiments show the DNS function being resident within a POP with edge servers, but other embodiments could place the DNS function geographically separate from any content serving functions. Other embodiments could place multiple DNS functions in a POP to divide the work load for those DNS requests received by the POP.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of resolving IP addresses of edge servers used for delivering a content object, comprising:

receiving, at a domain name service (DNS), a first DNS request to return an IP address of a first edge server to provide the content object for a first computing device;

analyzing, with the DNS, a subdomain field of the first DNS request to determine a first parameter that is related to a popularity of the content object;

determining the popularity of the content object based on the first parameter;

selecting the first edge server from a plurality of edge servers that are assignable to provide the content object, based on the popularity of the content object;

returning the IP address of the first edge server, in response to the first DNS request;

receiving, at the DNS, a second DNS request to return an IP address of a second edge server to provide the content object for a second computing device;

analyzing, with the DNS, a subdomain field of the second DNS request to determine a second parameter that is related to a popularity of the content object, the first and second parameters being different from one another;

determining the popularity of the content object based on the second parameter;

selecting the second edge server from the plurality of edge servers that are assignable to provide the content object, based on the popularity of the content object; and returning the IP address of the second edge server, in response to the second DNS request.

2. The method of resolving IP addresses of edge servers used for delivering a content object of claim 1, wherein:
the DNS is part of a content delivery network (CDN) comprising a plurality of points of presence (POPs) that are distributed geographically with respect to one another;
each of the POPs comprises a plurality of content caches;
the IP address of the first edge server results in the CDN serving the content object from a first one of the content caches; and
the IP address of the second edge server results in the CDN serving the content object from a second one of the content caches.

3. The method of resolving IP addresses of edge servers used for delivering a content object of claim 2, wherein:
the plurality of POPs comprises a first POP and a second POP;
the first POP includes the first one of the content caches; and
the second POP includes the second one of the content caches.

4. The method of resolving IP addresses of edge servers used for delivering a content object of claim 1, wherein:
the first request is received at a first time;
the second request is received at a second time that is later than the first time;
determining the popularity of the content object based on the first parameter comprises determining the popularity of the content object at the first time based on the first parameter; and
determining the popularity of the content object based on the second parameter comprises determining the popularity of the content object at the second time based on the second parameter.

5. The method of resolving IP addresses of edge servers used for delivering a content object of claim 1, wherein the subdomain field of the first DNS request includes additional information specifying one or more of:
level of quality of service (QoS) from a plurality of levels of QoS;
location of the first computing device;
characteristics of the first computing device;
information of a user of the first computing device;
characteristics of the content object;
transaction information; and
digital rights management information.

6. The method of resolving IP addresses of edge servers used for delivering a content object of claim 1, wherein returning the IP address of the first edge server comprises returning a time-to-live value for the IP address of the first edge server, that signals the IP address should not be cached for other computing devices beyond the time-to-live value.

7. One or more non-transitory machine-readable media having machine-executable instructions thereon, wherein the instructions, when executed by one or more servers, cause the servers to implement the method of resolving JP addresses of edge servers used for delivering a content object of claim 1.

8. A method of resolving IP addresses of edge servers used for delivering a content object from a content delivery network (CDN), comprising:
receiving, at a domain name service (DNS) and at a first time, a first DNS request to return an IP address of a first edge server to provide the content object for a first computing device;
analyzing, with the DNS, a subdomain field of the first DNS request to determine a first parameter that is related to a popularity of the content object at the first time;
determining the popularity of the content object at the first time based on the first parameter;
selecting the first edge server from a plurality of edge servers that are assignable to provide the content object, based on the popularity of the content object;
returning the IP address of the first edge server, in response to the first DNS request;
receiving, at the DNS and at a second time, a second DNS request to return an IP address of a second edge server to provide the content object for a second computing device;
analyzing, with the DNS, a subdomain field of the second DNS request to determine a second parameter that is related to the popularity of the content object at the second time, the first and second parameters being different from one another;
determining the popularity of the content object at the second time based on the second parameter;
selecting the second edge server from the plurality of edge servers that are assignable to provide the content object, based on the popularity of the content object; and
returning the IP address of the second edge server, in response to the second DNS request;
wherein:
the CDN comprises a plurality of points of presence (POPs) that are distributed geographically with respect to one another;
each of the POPs comprise a plurality of content caches;
the IP address of the first edge server results in the CDN serving the content object from a first one of the content caches; and
the IP address of the second edge server results in the CDN serving the content object from a second one of the content caches.

9. The method of resolving IP addresses of edge servers used for delivering a content object from a CDN of claim 8, wherein:
the plurality of POPs comprises a first POP and a second POP;
the first POP includes the first one of the content caches; and
the second POP includes the second one of the content caches.

10. The method of resolving IP addresses of edge servers used for delivering a content object from a CDN of claim 8, wherein:
one of the plurality of POPs includes both the first one and the second one of the content caches.

11. The method of resolving IP addresses of edge servers used for delivering a content object from a CDN of claim 8, wherein the subdomain field of the first DNS request includes additional information specifying one or more of:
level of quality of service (QoS) from a plurality of levels of QoS;
location of the first computing device;
characteristics of the first computing device;
information of a user of the first computing device;
characteristics of the content object;
transaction information; and
digital rights management information.

12. The method of resolving IP addresses of edge servers used for delivering a content object from a CDN of claim 8, wherein returning the IP address of the first edge server comprises returning a time-to-live value for the IP address of the first edge server that signals the IP address should not be cached for other computing devices beyond the time-to-live value.

13. A domain name service (DNS) that resolves addresses used for delivering content to computing devices, the DNS comprising:
    a processor configured to:
        receive a first DNS request to return an IP address of a first edge server to provide the content object for a first computing device;
        analyze a subdomain field of the first DNS request to determine a first parameter that is related to a popularity of the content object;
        determine the popularity of the content object based on the first parameter;
        select the first edge server from a plurality of edge servers that are assignable to provide the content object, based on the popularity of the content object;
        return the IP address of the first edge server, in response to the first DNS request;
        analyze a subdomain field of the second DNS request to determine a second parameter that is related to a popularity of the content object, the first and second parameters being different from one another;
        determine the popularity of the content object based on the second parameter;
        select the second edge server from the plurality of edge servers that are assignable to provide the content object, based on the popularity of the content object; and
        return the IP address of the second edge server, in response to the second DNS request;
    and a memory coupled with the processor.

14. The DNS that resolves addresses used for delivering content to computing devices of claim 13, wherein the processor is further configured to return a time-to-live value for the IP address of the first edge server, that signals the IP address should not be cached for other computing devices beyond the time-to-live value.

15. The DNS that resolves addresses used for delivering content to computing devices of claim 13, wherein:
    the DNS is part of a content delivery network (CDN) comprising a plurality of points of presence (POPs) that are distributed geographically with respect to one another,
    the first and second edge servers being part of one or more of the POPs.

16. The DNS that resolves addresses used for delivering content to computing devices of claim 15, wherein:
    each of the POPs comprises a plurality of content caches;
    the IP address of the first edge server results in the CDN serving the content object from a first one of the content caches; and
    the IP address of the second edge server results in the CDN serving the content object from a second one of the content caches.

17. The DNS that resolves addresses used for delivering content to computing devices of claim 16, wherein:
    the plurality of POPs comprises a first POP and a second POP;
    the first POP includes the first one of the content caches; and
    the second POP includes the second one of the content caches.

18. The DNS that resolves addresses used for delivering content to computing devices of claim 16, wherein:
    one of the plurality of POPs includes both the first one and the second one of the content caches.

\* \* \* \* \*